(12) United States Patent
Edwards et al.

(10) Patent No.: US 9,916,169 B2
(45) Date of Patent: Mar. 13, 2018

(54) SYSTEM AND METHOD FOR IN-BOX ELECTRONIC DEVICE PROVISIONING

(75) Inventors: Bryan Edwards, Boulder, CO (US); Peter Santeusanio, Hampton Falls, NH (US); John Bahr, Superior, CO (US); Kent Graham Bodell, Burnaby (CA); Stephen Rolapp, Boulder, CO (US); Caglan M. Aras, Los Gatos, CA (US)

(73) Assignee: Polycom, Inc., San Jose, CA (US)

( * ) Notice: Subject to any disclaimer, the term of this patent is extended or adjusted under 35 U.S.C. 154(b) by 942 days.

(21) Appl. No.: 13/088,158

(22) Filed: Apr. 15, 2011

(65) Prior Publication Data
US 2012/0262281 A1    Oct. 18, 2012

(51) Int. Cl.
*G06F 9/445* (2018.01)

(52) U.S. Cl.
CPC ................ *G06F 9/44505* (2013.01)

(58) Field of Classification Search
CPC ... G06K 7/0008; G06K 19/0723; G08C 19/28
USPC ......... 340/10.33, 5.54, 572.7, 586; 345/502; 375/240.25; 455/41.2; 700/214; 705/28; 710/8
See application file for complete search history.

(56) References Cited

U.S. PATENT DOCUMENTS

| | | | |
|---|---|---|---|
| 5,729,292 A * | 3/1998 | Acampora et al. ...... 375/240.25 |
| 6,670,958 B1 * | 12/2003 | Aleksic et al. ............... 345/502 |
| 6,778,096 B1 * | 8/2004 | Ward .................. G06F 9/44505 713/1 |
| 7,522,568 B2 * | 4/2009 | Twitchell, Jr. ........... H04Q 9/00 370/328 |
| 8,154,408 B2 * | 4/2012 | Spindel ................ G06K 7/0008 235/385 |
| 8,281,046 B2 * | 10/2012 | Wolff-Petersen et al. ........ 710/8 |
| 8,306,650 B1 * | 11/2012 | Antony et al. ................. 700/214 |
| 8,428,513 B2 * | 4/2013 | Sklovsky et al. ............ 455/41.2 |
| 2005/0027832 A1 * | 2/2005 | Bavaria ................ G06F 13/102 709/220 |
| 2005/0037707 A1 * | 2/2005 | Lewis .................. H04B 5/0062 455/41.1 |
| 2006/0232417 A1 * | 10/2006 | August et al. ............. 340/572.7 |

(Continued)

OTHER PUBLICATIONS

David Watts and Eric Chong, IBM—RedBooks—Implementing Asset ID, Feb. 2001, 206 pages, US.

*Primary Examiner* — An T Nguyen
(74) *Attorney, Agent, or Firm* — Blank Rome, LLP

(57) ABSTRACT

Configurable electronic devices contain identifying information in a dual-ported memory. A plurality of un-configured units are assembled into a set. Using identifying information, a provisioning server matches each particular unit to configuration settings needed to appropriately configure that device for use by a specific end user. The configuration settings and/or data may be transmitted to the devices via their embedded RFID systems and stored in their dual-ported memory (via the first memory port). The electronic devices may comprise processor-based systems and, upon system initialization, the configuration data can be read from the memory via a second port thereof and used to configure the device for use by the user. In this way, devices may be configured as a set destined for a particular end user immediately prior to shipment and/or deployment and it is not necessary to separately track customized units prior to assembling them into a set.

19 Claims, 4 Drawing Sheets

(56) References Cited

U.S. PATENT DOCUMENTS

| | | | |
|---|---|---|---|
| 2008/0167933 A1* | 7/2008 | Hoffman et al. | 705/9 |
| 2008/0238676 A1* | 10/2008 | Dhillon | G08B 13/2482 340/572.1 |
| 2010/0245094 A1* | 9/2010 | Tan | 340/586 |
| 2011/0128129 A1* | 6/2011 | Graczyk et al. | 340/10.33 |
| 2011/0156866 A1* | 6/2011 | Denison et al. | 340/5.54 |
| 2011/0248826 A1* | 10/2011 | Criel | G06F 17/30867 340/10.1 |
| 2012/0086559 A1* | 4/2012 | Trappeniers | G06Q 10/06 340/10.5 |

* cited by examiner

SYSTEM AND METHOD FOR IN-BOX ELECTRONIC DEVICE PROVISIONING

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates to configuring electronic devices prior to their deployment in the field. More particularly, it relates to downloading configuration data to devices using RFID technology.

2. Description of the Related Art Including Information Disclosed Under 37 CFR 1.97 and 1.98.

Many electronic devices must be customized for use by a particular user and/or use in a particular environment or system—e.g., a local area network ("LAN") or private branch exchange ("PBX"). The process of customizing such devices is called "configuration" or "provisioning." The data used to effect the configuration may be stored on (and retrieved from) a "provisioning server."

Current solutions involve removing a device to be provisioned from the package, applying power, provisioning the device, and repackaging the device. This procedure can be costly and error prone. Moreover, once a generic device has been provisioned, it becomes a unique device and must be individually managed and tracked throughout the remainder of the deployment process.

At least one electronic provisioning system is commercially available in the prior art. It employs a technology known as "Radio-frequency identification" (RFID) which commonly involves the use of an object (typically referred to as an "RFID tag") that is applied to or incorporated into a product for the purposes of identification and tracking using radio waves. Some tags can be read from several meters away and beyond the line of sight of the reader.

Radio-frequency identification involves "interrogators" (also known as "readers"), and "tags" (also known as "labels").

Most RFID tags contain at least two parts. One is an integrated circuit for storing and processing information, modulating and demodulating a radio-frequency (RF) signal, and other specialized functions. The second is an antenna for receiving and transmitting the signal.

There are generally three types of RFID tags: active RFID tags, which contain a battery and can transmit signals autonomously; passive RFID tags, which have no battery and require an external source of power to provoke signal transmission; and, battery assisted passive (BAP) RFID tags, which require an external source to wake up but have significantly higher forward link capability (thereby providing greater range).

A provisioning system known as Asset ID™ technology available from IBM (Armonk, N.Y.) employs a small radio-readable (and writable) memory chip that can be mounted on the motherboard of a personal computer. The electronic tag contains information about the computer, and can be both read and written using Quetel software, Symbol 6100 PDTs and HID AMH-100 Handheld Asset Tag Readers. For other applications, HID Corporation (Irvine, Calif.) provides wall-mounted or doorway-shaped tag readers. Briefly, the type of information on the RFID tag includes the computer UUID (Unique User Identification) number, serial number, software image loaded onto the PC, CPU type and RAM, hard drive capacity, user name, position, address, and many other types of data elements. IBM Asset ID™ tags are "Dual-ported" and by being mounted on the mother board during manufacture they can be accessed either from the computer BIOS or from the various tag readers.

The rewritable Asset ID tags have enough memory capacity to store additional pertinent information about the personal computer. During the procurement process, user-specific information can be written to the embedded Asset ID tag.

Asset ID is made up of components both internal to PCs and external to system units. The Asset ID subsystem includes three components:

An EEPROM non-volatile memory module, integrated on the system planar.

A passive antenna, attached inside the system unit.

A radio frequency (RF) reader, an external device. One implementation uses the combination of a handheld programmable barcode scanner (known as a portable data terminal or PDT) and an RF reader. There are generally three types of reader: handheld, portal, and panel.

The EEPROM and antenna are collectively called the tag.

Typically, the system interface of the EEPROM is connected to a bus within the asset to allow access to the data from the system. Since the tag is integrated into the asset, this tag is called an integrated tag.

The Asset ID EEPROM is a non-volatile memory space. Information stored there remains intact even after a system power failure. It can be read from and written to using either of two interfaces:

The system bus interface is used by the system BIOS and application software running on the system to store and retrieve asset information on the EEPROM. LOCM, IBM Director and UM Services are three examples of an application that writes to the Asset ID EEPROM through the system bus interface.

The RF interface connects to the antenna where the asset information can be read and written by an RF reader.

When the system is switched on, the EEPROM draws its power from the system power supply. When the system is not switched on, the EEPROM draws its power from the RF field generated by the RF reader. This allows one to access the tag even when the system is not connected to a power outlet, such as when it is inside a shipping carton.

The serial area holds all the serial numbers of the system. This area can be written and read through the system interface but can only be read by the RF interface.

The configuration area contains details about the basic system configuration. It is updated automatically by the system BIOS during the initial power-on sequence when it detects a new component. The BIOS will compare the system state with the configuration area and make corrections if differences exist (for example, a new memory DIMM or CPU is added).

The user area consists mostly of personal data. This area is the only one that can be updated via the RF interface. The fields are separated into groups which may include user information, lease information, asset information, network connection information and one or more custom fields.

In the IBM Asset ID system, the antenna is a passive RF receiver/transmitter and therefore does not have any power source of its own. It is designed to read data from the EEPROM and write data to the EEPROM using the energy generated by the RF field from the reader. In operation, the reader initiates communications by generating a 125-kHz RF carrier signal modulated with information to be sent to the antenna and EEPROM (collectively called the tag). The reader then generates an unmodulated carrier and waits for a response from the tag. The tag uses backscatter modulation (BSM) to respond to the reader.

In this technique, the tag sends information to the reader by modulating the field generated by the reader and reflecting it back. The tag inside the PC is not capable of generating any RF signal on its own. It can only respond to the field generated by a reader designed for use with RFID.

The RF reader/writer is an external device that communicates with the Asset ID tag via the RF antenna. A reader is required to read or write data using the RF interface. The three types of reader are: handheld, portal, and panel.

A handheld reader is a reader that is battery operated and designed for portable use. These devices are typically designed to be lightweight with an antenna that is easily positioned within close proximity to a tag.

Applications for these readers include deployment or inventory of assets throughout the enterprise.

An example is the combination of the Symbol Corporation Portable Data Terminal (PDT) and HID Corporation's AMH100 handheld reader as discussed below. This portable combination allows one to read from and write to the Asset ID tag plus upload that data to a PC-based application via the PDT's serial interface.

The PDT is completely programmable via the serial interface. Typically, the PDT software is downloaded during the installation of the asset software on the PC to which it is connected.

Panel readers are usually mounted on a wall or placed on a counter near a protected area. This type of reader is primarily used in a paperless, property pass application.

Portal readers are devices that have a more permanent installation, typically located at a doorway or portal to a protected area. Portal readers are positioned so as to require the asset to be carried through the reader field to exit or enter the area.

Regardless of the reader type, since power for the EEPROM is obtained from the RF signal generated by the reader, it is possible to read and write the EEPROM with the asset still in the shipping box. However, once unique data is written to the EEPROM, the device becomes customized—i.e., unique—and must be individually tracked through the remainder of the deployment process. This can necessitate a rather complex infrastructure and preclude the use of such a system in facilities lacking all of the necessary components and systems. The present invention solves this problem.

BRIEF SUMMARY OF THE INVENTION

Configurable electronic devices contain identifying information in dual-ported memory. Prior to being configured for use by a particular end user, unconfigured generic units are gathered into a co-located deployment and/or shipment set—e.g., on a shipping pallet.

While on the shipping pallet, each unit's identity information (previously stored in the memory) is read from a first port of the unit's memory by means of an RFID system. Using the identifying information so obtained, a provisioning server then matches each particular unit of the set to one or more configuration settings or other data needed to appropriately configure the devices for use by a certain end user. The configuration settings and/or data are transmitted to the devices via the RFID system and stored in their memory (via the first memory port).

The electronic devices may be processor-based devices and upon system initialization, the configuration data may be read via a second port from each unit's memory and used to appropriately configure each device for use by its intended end user.

An apparatus according to the invention can power a dual port RFID system RAM from both sides and load data using RFID side power and pull out data using the "normal side" power and port. It should be appreciated that is integrated or embedded into the full system, not just a stuck-on label.

An example of information that may be loaded is feature enable/disable. Another example is addressing information. The invention encompasses both a device and a method for pallet level or closed box provisioning.

Practice of the invention streamlines the provisioning process, enabling distributors to perform provisioning faster, cheaper, and more accurately than using a manual system while avoiding the need for individually tracking customized devices through the entire deployment and distribution systems.

BRIEF DESCRIPTION OF THE SEVERAL VIEWS OF THE DRAWING(S)

DETAILED DESCRIPTION OF THE INVENTION

The invention may best be understood by reference to one or more illustrative embodiments. One such illustrative embodiment is an in-box, device provisioning system.

Currently, in order to provision a plurality of devices intended for a single destination, distributors have to either remove each device to be provisioned from its box; apply power; provision it, and repackage it or use an Asset ID-type system to provision individual devices while still in the box. The former can be a costly and error-prone activity while the latter still requires units to be individually handled. Both result in a plurality of individually customized units that must then be separately tracked.

The method of the invention employs two principal hardware components: a dual ported read/write non-volatile memory installed in each of the devices to be provisioned; and, a device provisioning station that is in data communication with the devices.

The dual ported read/write non volatile memory uses an RFID port, and a classic wired port (e.g. I2C). During the manufacturing process, device type (e.g. model number), device identification (e.g. MAC address), device weight, and other information is written to the non volatile memory.

A device provisioning station according to the invention may comprise an RFID reader/writer, a scale, and a data store that contains customer, billing, shipping, and other information as appropriate. During provisioning, a set of devices to be provisioned may be placed on a scale. The RFID reader is used to scan all of the devices to be provisioned, read the information stored in the nonvolatile memory, and write the provisioning information to the devices as appropriate. After the provisioning of the devices is complete, the nonvolatile memory may be locked to prevent any of the provisioning parameters to be changed. The lock may be implemented in either hardware (e.g. fuse) or in software (e.g., by using a digital security key).

As a secondary check that all devices in the set have been provisioned, the total weight of the set of devices on the scale may be compared to the expected sum of the weights of each device. In certain embodiments, the provisioning station compensates for the weight of the packaging materials as appropriate. If the observed weight of the set does not match (within preselected margins) the expected weight based on the number of units in the order, the operator may be informed of the discrepancy. After a device has been provisioned, the on-board microprocessor can read the provisioning information from the non-volatile memory and configure the system in conformance with that information. This may occur, for example, when a device is initially powered up or connected to a network.

Figure 1:
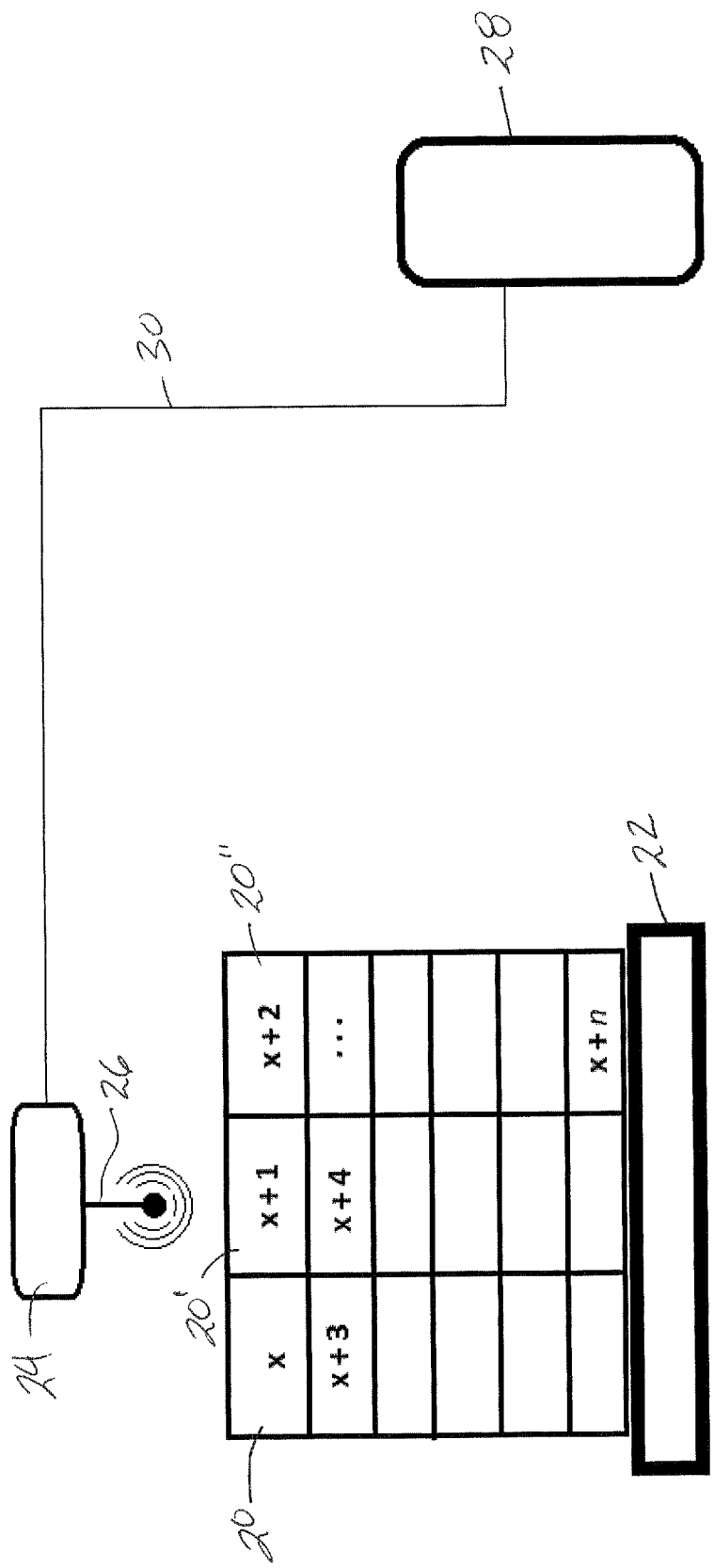
FIG. 1 is a diagram showing a pallet holding n+1 units of an electronic device which are being configured by a provisioning server via an RFID data link.

Referring to FIG. 1, n+1 units of electronic device 20 are shown stacked for shipment on pallet 22. Devices 20 may be packed in individual boxes with conventional impact-absorbing packaging materials. Each device 20 may have a unique identifier (e.g., serial number or the like). Devices 20 may be processor-based devices that comprise non-volatile memory. The unique identifier may be stored in the non-volatile memory.

In operation, antenna 26 of RFID scanner 24 is positioned sufficiently close to devices 20 on pallet 22 to permit radio communication between scanner 24 and each of the embedded RFID tags in devices 20. RFID scanner 24 may be permanently mounted on a structure (e.g., in a warehouse or shipping terminal) or be configured for handheld portable operation. RFID scanner 24 is in data communication with provisioning system 28 via data link 30. Data link 30 may be a wired link or a wireless link.

Figure 2:
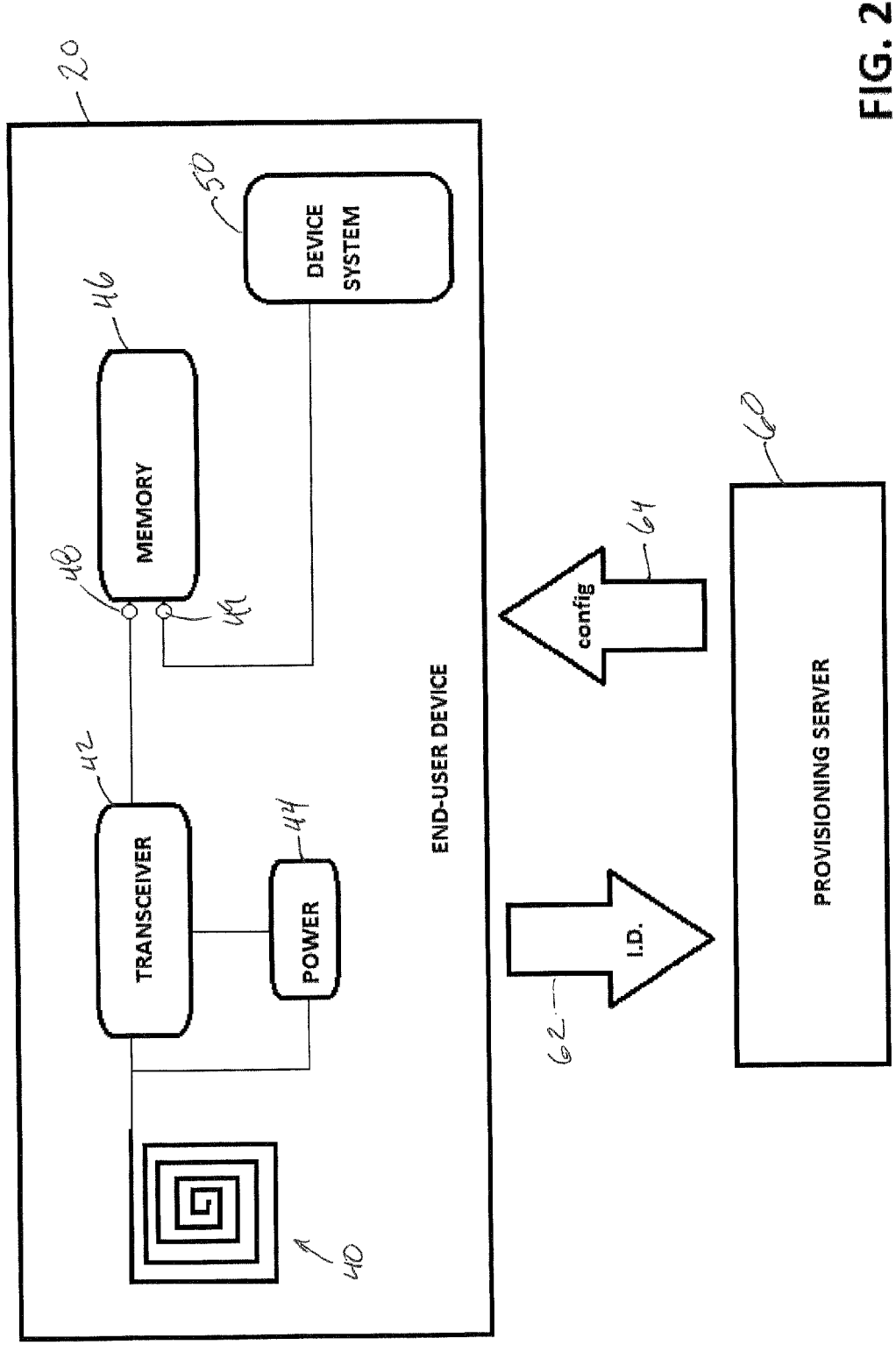
FIG. 2 is a block diagram showing an end-user electronic device having an embedded RFID subsystem and the information flow to and from a provisioning server via the RFID system.

Referring now to FIG. 2, end user device 20 is shown in block diagram form. End user device 20 includes an embedded RFID tag comprised of antenna 40, transceiver 42, power converter 44 and dual-ported, non-volatile memory 46.

Antenna 40 may be inductively coupled to a source of radio-frequency (rf) energy (such as may be emitted by antenna 26 of RFID scanner 24). electrical energy so produced may be converted by power converter 44 to a voltage and frequency range suitable for powering transceiver circuit 42. Alternatively, transceiver 42 may be battery powered.

RFID transceiver 42 is in data communication with nonvolatile member 46 via a first port 48. Non-volatile memory 46 is also in data communication via second port 49 with system of end-user device 20 (which may be a processor-based system). Thus, both RFID transceiver 42 and device system 50 may read and/or write data to memory 46.

Provisioning server 60 is in data communication with end user device 20 via an RFID system. The flow of information between end-user device 20 and provisioning server 60 is indicated by arrows 62 and 64.

End user device 20 requires certain provisioning information in order to configure itself for its intended use. In certain embodiments of the invention, the provisioning information may be obtained by a salesperson at the time the devices were ordered and entered (e.g., into a spreadsheet) by model number or other unit identifier. That information, matched to the order information, may be loaded into the supplier's database. When the devices are ready for provisioning, the information may be sent to or otherwise entered into the provisioning server.

By way of example only, end-user device 20 may be a teleconference endpoint—e.g., a speakerphone. When interrogated by RFID scanner 24, device 20 may respond with its unique identifier (e.g. its model and serial numbers). Provisioning server 60 may then determine via database query [or table lookup] the particular configuration settings and parameters for the particular unit 20. For example, unit 20 may require an IP address, a telephone number, and/or the address of a server for operations using a Voice over IP (VoIP) protocol.

The configuration information is loaded into memory 46 via first port 48 by the embedded RFID system. Subsequently, the unit(s) is shipped to the customer or end user who deploys the unit in a conferencing or telephone system. Upon power-up, the device's system may retrieve the configuration data from non-volatile memory 46 via second port 49 and configure the device appropriately for operation in the customer's teleconferencing system.

Figure 3A:
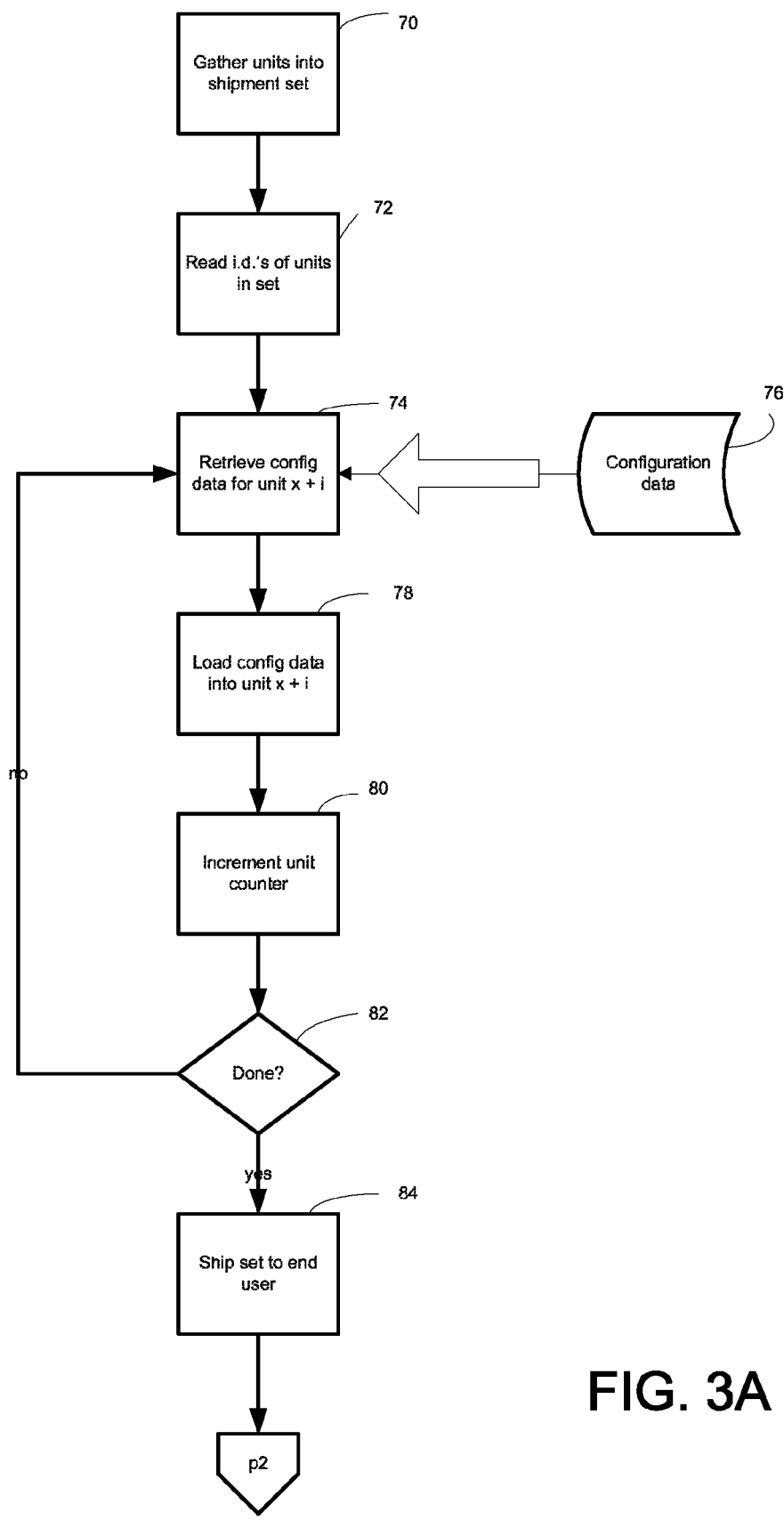
FIGS. 3A and 3B are a flow diagram of a provisioning method according to one embodiment of the invention.

Referring now to FIG. 3, a provisioning process according to one embodiment of the invention is shown in flowchart form.

At block 70, un-configured units of a configurable electronic device are physically gathered into a co-located shipment set—e.g., on a shipping pallet (optionally held together with a surrounding polymer film which may be a shrink-wrap film) or in a shipping container (which may be a corrugated paperboard box). The co-located set may be on a scale. Each of the units comprises an embedded RFID data with a dual-ported memory. At block 72, an RFID reader is used to read identifying information previously stored in each unit. In certain embodiments, the identifying information may be a unit serial number. At this point, the number of units comprising the shipment set may also be determined (e.g., by counting the number of responses received) and, optionally, compared to the expected number (obtained from the order information) and/or the number of units computed from the measured weight of the shipment set. Any discrepancy could be flagged for operator intervention.

It will be appreciated by those skilled in the art that, when a plurality of RFID-tagged devices are scanned simultaneously, the replies can "collide" with one another making reading difficult. There are a number of ways known in the art for dealing with this potential problem. One way is to scan the beam of the reading device in one or more axes with a mechanically or electronically steerable antenna so as to sequentially aim the beam at individual devices in the set. Another method (particularly suitable for devices stacked in a row/column matrix) is to use a focused beam antenna to select a certain column and vary the radiated power to select a certain row—the row/column intersection being specific to a certain device to be read. This method may be of particular advantage when interrogation occurs as the shipment set is moved past (or through) the reader. Yet a third method is to provide the tags in the devices with collision detection and randomized reply software. In this way, each tags being interrogated may delay its response by a period of time of random length (within predefined limits) so as to lessen the possibility of its reply coinciding with that of another device in the set. Subsequent, repeat interrogations can virtually eliminate the possibility of repeat collisions. A fourth method is to know the unique identifier, such as the serial number, of each device and then perform specific, identifier-based communications. In many instances, the serial numbers of the devices which constitute the shipment set will be determined as the devices are packaged for shipment. This data can then be used to perform the configuration based on the unique identifier. Each device may be specifically addressed and then respond with an acknowledgement before configuration proceeds.

The reader may be a portal reader and the interrogation may be accomplished as the shipment set is moved through a portal of a shipping terminal or configuration facility, for example.

For a particular unit in the shipment set, the configuration data 76 for that unit is retrieved (at block 74) from a data storage device (which may be part of a configuration server). The unit's configuration data (which may be data unique to that unit) is loaded (at block 78) into the unit via the RFID system. The configuration data may be stored in dual-ported memory within the unit.

At block 80, the unit counter is incremented and, at decision diamond 82, the result compared to the unit count previously determined at block 72. If additional units remain to be loaded with configuration data ("no" branch at 82), the process repeats for the next unit in succession at block 74. If, on the other hand, all units in the shipment set have been loaded with configuration data ("yes" branch at 82), the shipment set is ready for deployment to the end user and it may now be shipped (block 84).

Figure 3B:
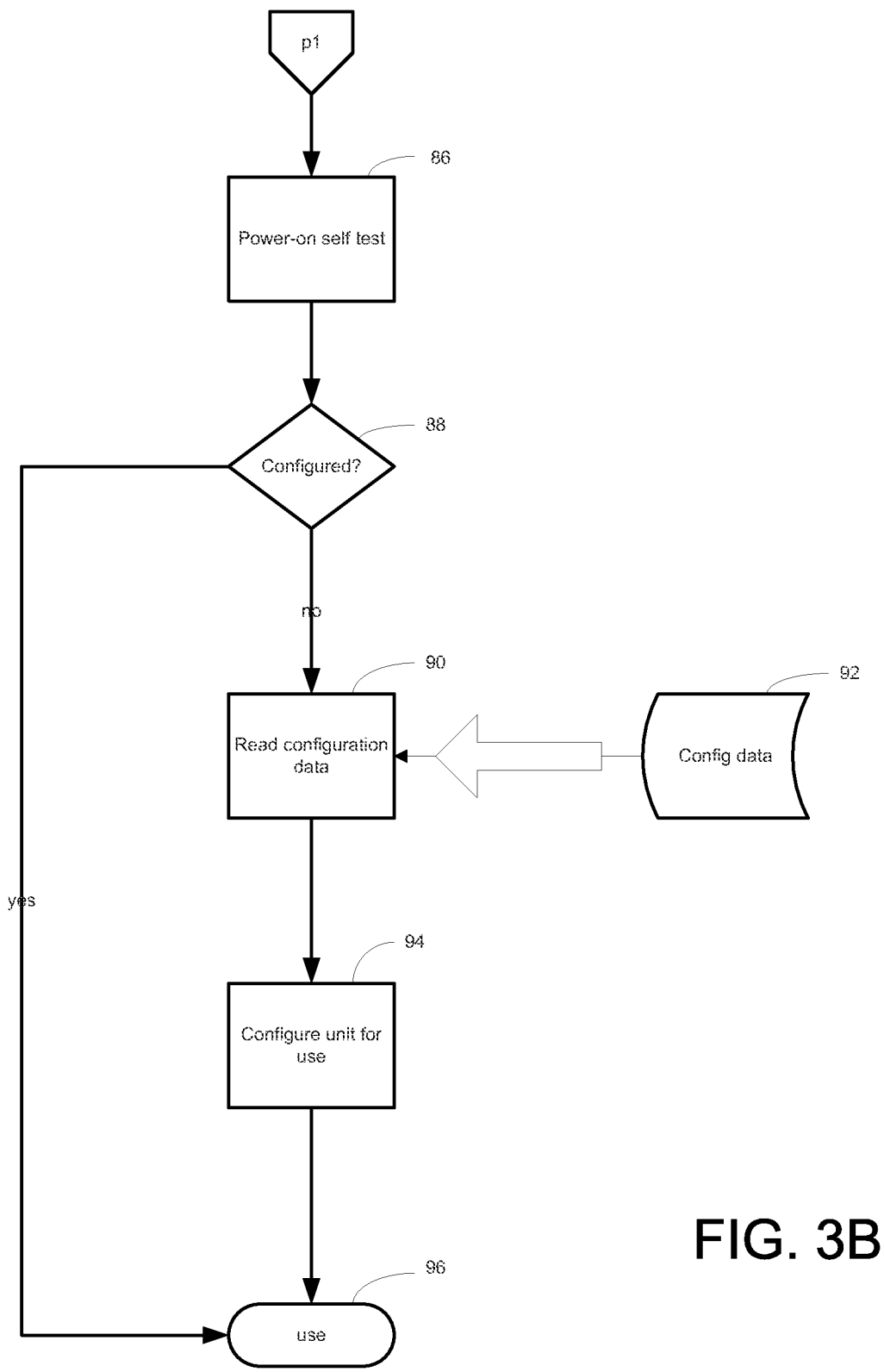

Following deployment at the end user's facility, the process continues in each individual unit as shown in FIG. 3B. In the illustrated embodiment, the units are processor-based devices that automatically execute a power-on self test (POST) when they are switched on, otherwise powered-up or connected to a communications network (block 86). As part of the power on self test, the unit may determine whether it is in a configured state. If so ("yes" branch at decision diamond 88), the unit is ready for use (at 96). If, however, the unit is not yet configured ("no" branch at diamond 88), the configuration process continues at block 90 with configuration data 92 being read by the system from the unit's dual-ported memory via a second port thereof. This situation will obtain the first time the unit is used by the end user and may obtain with each subsequent use if the configuration state is volatile.

At block 94 the unit's system uses the configuration data 92 to appropriately configure the unit for use (at 96). The configuring process may comprise selectable settings appropriate for and/or unique to the end user's system and/or network environment.

It will be appreciated by those skilled in the art that the invention may be practiced with any set of processor-based devices that can benefit from having configuration data pre-loaded prior to shipment to an end user. By way of example only, such devices include audio and/or video teleconferencing endpoints, cellular phones, personal digital assistants, personal computers, active employee identification badges, and the like.

It will be appreciated by those skilled in the art that the practice of the invention disclosed hereinabove permits configurable electronic devices to remain in an un-configured (i.e., generic) state until just prior to shipment and/or deployment. In this way, the complexity, components and overhead needed for tracking individual units is avoided. A shipment set of generic units may be assembled in a single location—e.g. on a shipping pallet—and then provisioned as a set. Alternatively, generic units may be shipped to a configuration center or even a customer's facility where they can subsequently be configured as a group. This permits generic units to be held in inventory and simplifies the logistics of device deployment.

Although the invention has been described in detail with reference to certain preferred embodiments, variations and modifications exist within the scope and spirit of the invention as described and defined in the following claims.

The invention claimed is:

1. A method of configuring a plurality of processor-based systems, each of which comprises:
   a processor;
   a tag, which comprises:
      a radio-frequency receiver configured to provide identity information in response to an identity request radio-frequency signal and to store system configuration data received in a subsequent, system configuration data write radio-frequency signal; and
      a data storage device in data communication with both the receiver and the processor and for storing system configuration data received in system configuration data write radio-frequency signals, wherein the system configuration data is data for configuring portions of the processor-based system other than the tag; and
   a medium storing instructions for causing the processor to retrieve the system configuration data received in the system configuration data write radio-frequency signal from the data storage device and to configure the operating characteristics of the processor-based system based on the system configuration data;
   the method comprising the steps of:
   gathering a plurality of the processor-based systems into a co-located set;
   sending identity request radio-frequency signals to the set;
   receiving identity information provided by a first processor-based system in response to an identity request radio-frequency signal;
   matching first system configuration data to the identity information associated with the first processor-based system;
   receiving identity information provided by a second processor-based system in response to an identity request radio-frequency signal;
   matching second system configuration data to the identity information associated with the second processor-based system; and
   sending the first and second system configuration data in individual system configuration data write radio-frequency signals identifying the first or second processor-based system to the set.

2. A method as recited in claim 1 wherein the processor-based systems being configured are teleconferencing endpoints.

3. A method as recited in claim 1 wherein the processor-based systems being configured are selected from the group consisting of: telephones; video terminals; mobile communication devices; personal digital assistants; personal computers; and, active personnel identification devices.

4. A method as recited in claim 1 wherein the data storage device is a dual-ported random access memory.

5. A method as recited in claim 1 wherein the data storage device is a dual-ported flash memory.

6. A method as recited in claim 1 wherein the co-located set is on a shipping pallet.

7. A method as recited in claim 1 wherein the co-located set is in a shipping container.

8. A method as recited in claim 7 wherein the shipping container is a corrugated paperboard box.

9. A method as recited in claim 1 wherein the co-located set comprises a plurality of containers held together with a surrounding shrink-wrap polymer film.

10. A method as recited in claim 1 wherein sending the identity request radio-frequency signal is performed when the co-located set is being moved.

11. A method as recited in claim 10 wherein the movement is through a portal.

12. A method as recited in claim 10 wherein the movement is through a shipping facility.

13. A method as recited in claim 1 wherein the identifying information provided by a first processor-based system comprises the serial number of the device which comprises the first processor-based system.

14. A method as recited in claim 1 wherein the identifying information provided by a first processor-based system comprises information identifying an intended user of the device which comprises the first processor-based system.

15. A method as recited in claim 1 wherein the identifying information provided by a first processor-based system comprises information identifying an intended data communication network to which the device which comprises the first processor-based system will be connected.

16. A method as recited in claim 1 wherein the first system configuration data comprises an internet protocol address.

17. A method as recited in claim 1 wherein the first system configuration data comprises a telephone number.

18. A method as recited in claim 1 further comprising:
obtaining ordering information from a prospective end user of the processor-based systems;
correlating the ordering information with system configuration data;
entering the correlated ordering information and system configuration data into a database; and,
reading the first system configuration data and second system configuration data from the database.

19. A device provisioning system for configuring a plurality of processor-based systems each of which comprises:
a processor;
a tag, which comprises:
 a radio-frequency receiver configured to provide identity information in response to an identity request radio-frequency signal and to store system configuration data received in a subsequent, system configuration data write radio-frequency signal;
 a data storage device in data communication with both the receiver and the processor for storing the system configuration data received in the system configuration data write radio frequency signal and for storing system configuration data received in system configuration data write radio-frequency signals, wherein the system configuration data is data for configuring portions of the processor-based system other than the tag; and
a medium storing instructions for causing the processor to retrieve the system configuration data received in the system configuration data write radio-frequency signal from the data storage device and to configure the operating characteristics of the processor-based system based on the system configuration data;
the device provisioning system comprising:
a radio-frequency transceiver;
a database containing system configuration data for the processor-based systems;
an automatic controller connected to the radio-frequency transceiver and in data communication with the database, the controller programmed to:
 send identity request radio-frequency signals from the transceiver to a co-located set comprised of a plurality of the processor-based systems;
 receive identity information provided by a first processor-based system in response to an identity request radio-frequency signal;
 match first system configuration data to the identity information associated with the first processor-based system;
 receive identity information provided by a second processor-based system in response to an identity request radio-frequency signal;
 match second system configuration data to the identity information associated with the second processor-based system; and
 send the first and second configuration data in individual system configuration data write radio-frequency signals identifying the first or second processor-based system to the set.

* * * * *